(12) United States Patent
Kent

(10) Patent No.: US 11,109,715 B2
(45) Date of Patent: Sep. 7, 2021

(54) FOOD PROCESSOR

(71) Applicant: Progressive International Corporation, Kent, WA (US)

(72) Inventor: Joseph Kent, Kent, WA (US)

(73) Assignee: Progressive International Corporation, Kent, WA (US)

( * ) Notice: Subject to any disclaimer, the term of this patent is extended or adjusted under 35 U.S.C. 154(b) by 146 days.

(21) Appl. No.: 16/676,925

(22) Filed: Nov. 7, 2019

(65) Prior Publication Data

US 2020/0156031 A1    May 21, 2020

Related U.S. Application Data

(63) Continuation of application No. 16/255,613, filed on Jan. 23, 2019.

(60) Provisional application No. 62/621,326, filed on Jan. 24, 2018.

(51) Int. Cl.
| | |
|---|---|
| *A47J 43/06* | (2006.01) |
| *A47J 43/08* | (2006.01) |
| *B01F 15/00* | (2006.01) |
| *B01F 7/20* | (2006.01) |
| *B01F 13/10* | (2006.01) |
| *A47J 43/044* | (2006.01) |

(52) U.S. Cl.
CPC .......... *A47J 43/082* (2013.01); *A47J 43/044* (2013.01); *A47J 43/06* (2013.01); *B01F 7/20* (2013.01); *B01F 13/1041* (2013.01); *B01F 15/00506* (2013.01); *B01F 2013/108* (2013.01); *B01F 2015/00603* (2013.01); *B01F 2015/00623* (2013.01); *B01F 2215/0026* (2013.01)

(58) Field of Classification Search
CPC ........ A47J 43/044; A47J 43/06; A47J 43/082; B01F 15/00506; B01F 2015/00603; B01F 2013/108; B01F 7/1695; B01F 7/00583
USPC ........................................... 241/92
See application file for complete search history.

(56) References Cited

U.S. PATENT DOCUMENTS

| | | | | |
|---|---|---|---|---|
| 3,738,619 A | * | 6/1973 | Shirae | ........ B01F 7/16 366/98 |
| 5,035,320 A | | 7/1991 | Plone | |
| 5,355,784 A | * | 10/1994 | Franklin | ........ A47J 19/027 241/199.12 |
| 5,544,573 A | * | 8/1996 | Gateaud | ........ A47J 43/046 200/302.2 |
| 5,735,193 A | | 4/1998 | Chang | |
| 6,035,771 A | | 3/2000 | Conran et al. | |
| 7,069,839 B2 | * | 7/2006 | Kernan | ........ A47J 43/0777 241/37.5 |
| 7,264,189 B2 | | 9/2007 | Holcomb et al. | |
| 8,402,886 B2 | | 3/2013 | Herren | |

(Continued)

*Primary Examiner* — Faye Francis
(74) *Attorney, Agent, or Firm* — Lowe Graham Jones PLLC

(57) ABSTRACT

A manual food processor includes a container with a removeable lid. The container includes a plurality of container undulations spaced along an upper portion of the container to form a seat. The lid is removably attachable to the container to enclose the interior space, and includes a food processing tool carried on a drive shaft. The lid further has a plurality of lid undulations which are complementary to and engageable with the plurality of container undulations, preventing the lid from rotating with respect to the container, and allowing removal of the lid without rotation of the lid.

20 Claims, 8 Drawing Sheets

(56) References Cited

U.S. PATENT DOCUMENTS

| | | | |
|---|---|---|---|
| 8,635,948 B2 | 1/2014 | Herren | |
| 8,814,072 B2 * | 8/2014 | Gushwa | A47J 43/0716 241/36 |
| 9,591,949 B2 * | 3/2017 | Merl | A47J 43/0711 |
| 2004/0222326 A1 * | 11/2004 | Naud | A47J 43/082 241/283 |
| 2007/0180727 A1 | 8/2007 | Wan et al. | |
| 2009/0320696 A1 | 12/2009 | Herren | |
| 2011/0226140 A1 | 9/2011 | Herren | |
| 2013/0184118 A1 | 7/2013 | Chan et al. | |
| 2014/0203127 A1 * | 7/2014 | Merl | A47J 43/0711 241/100 |

* cited by examiner

FOOD PROCESSOR

PRIORITY CLAIM

This application is a continuation of U.S. patent application Ser. No. 16/255,613 filed Jan. 23, 2019 which claims the benefit of U.S. provisional application No. 62/621,326, filed Jan. 24, 2018, the contents of which are incorporated by reference.

FIELD OF THE INVENTION

This invention relates generally to manually-operated food processing devices.

BACKGROUND OF THE INVENTION

It can be useful to have a manually-operated food processor for various chopping or mixing jobs in food preparation. In many cases, a relatively small version of such a food processor is convenient, consuming little space and providing a tool appropriately sized for a fresh-made batch of salsa or similar chopped or mixed food items.

In some cases, it can be especially useful to have the ability to adjust the speed of a rotary blade in such a chopping device. Some existing chopping devices have internal gearing to allow a drive shaft to rotate faster than the rotational speed of the hand crank, but they fail to provide the ability to operate the drive shaft at multiple selected gearing ratios.

SUMMARY OF THE INVENTION

A preferred version of the present invention includes a hand-crank operated food processor having a container with a removeable lid. The lid incorporates a number of gears that are operable by the hand crank to cause a drive shaft to spin, imparting a rotational force to a food processing implement such as a blade or a paddle carried on the drive shaft. Most preferably, the crank can be inserted into any one of a plurality of attachment points such that rotation of the crank handle in a selected attachment point will rotate the gears, and therefore the drive shaft, at a different rotational speed as compared to the rotational speed achieved at a different one of the plurality of attachment points at the same input speed from the crank.

In one version, the food processor includes a container having a base and a sidewall extending upwardly from the base to a rim, the container defining an interior space. A lid is removably attachable to the container to enclose the interior space, the lid having an upper portion and a lower portion combining to form a housing, the lower portion facing toward the interior space when the lid is attached to the container. A first gear coupler is positioned on the upper portion of the lid, with a second gear coupler positioned on the upper portion of the lid. A crank is removably attachable to a selected one of the first gear coupler or the second gear coupler. At least one food processing tool is carried on a drive shaft, the drive shaft being attachable to the lower portion of the lid. A plurality of gears is mounted within the housing and engaged between the first gear coupler and the drive shaft and between the second gear coupler and the drive shaft. When the crank is attached to the first gear coupler and rotates the first gear coupler at a first rotational speed the plurality of gears causes the drive shaft to rotate at a first drive shaft rotational speed, and when the crank is attached to the second gear coupler and rotates the second gear coupler at the first rotational speed the plurality of gears causes the drive shaft to rotate at a second drive shaft rotational speed, the second drive shaft rotational speed being greater than the first drive shaft rotational speed.

In some versions, a raised gear box is formed in the housing, the plurality of gears being positioned within the gear box.

In a preferred version, the plurality of gears further comprises a first drive gear mounted for common rotation with the first gear coupler, a first transmission gear enmeshed with the first drive gear, a driving gear axially mounted for common rotation with the first transmission gear, and a driven gear enmeshed with the driving gear, the driven gear being connected to the drive shaft, whereby rotating the first gear coupler causes rotation of the first drive gear, the first transmission gear, the driving gear, the driven gear, and the drive shaft.

Most preferably, the plurality of gears further comprises a second drive gear mounted for common rotation with the second gear coupler, a second transmission gear enmeshed with the second drive gear, the driving gear further being axially mounted for common rotation with the second transmission gear, whereby rotating the second gear coupler causes rotation of the second drive gear, the second transmission gear, the driving gear, the driven gear, and the drive shaft.

In some versions, the driven gear is connected to the drive shaft for common rotation about an axis defined by the drive shaft.

In a preferred example, the second rotational speed is at least twice as great as the first rotational speed.

Preferably, a drive post is axially connected to the driven gear, the drive shaft being removably attachable to the drive post. The drive post may further comprise an internal drive post portion positioned within the housing and an external drive post portion extending outside the lower housing portion.

Preferably, the external drive post portion terminates in a keyed portion configured for attachment to a mating keyed cavity of the drive shaft.

In some versions, the upper portion of the container comprises an undulating seat, and wherein the lower portion of the lid comprises a mating undulating surface.

A version of the invention includes a food processor with a container having a base and a sidewall extending upwardly from the base to a container rim, the container defining an interior space. The container has a plurality of container undulations spaced along an upper portion of the container. A lid is removably attachable to the container to enclose the interior space.

At least one food processing tool is carried on a drive shaft, the drive shaft being attachable to the lid and defining a central axis of the container when the lid is attached to the container and the drive shaft is attached to the lid. The lid further has a plurality of lid undulations, the plurality of lid undulations being sized and positioned to be complementary to and engageable with the plurality of container undulations when the lid is attached to the container, wherein the lid undulations and the container undulations interact with one another to prevent the lid from rotating with respect to the container, and further wherein the lid undulations and the container undulations are disengageable with one another by movement of the lid along the central axis and without rotation of the lid.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
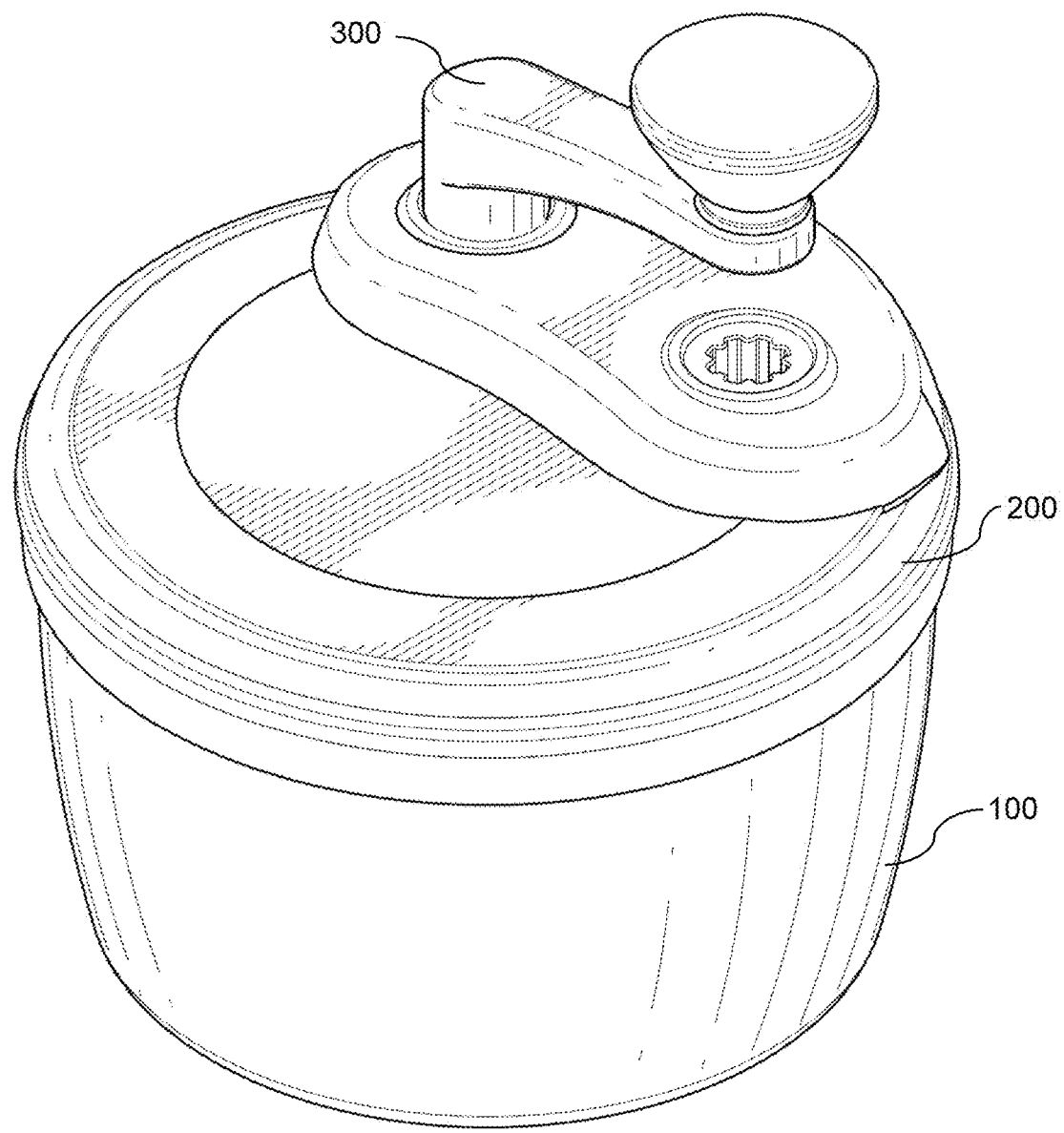
FIG. 1 is a top perspective view of a preferred food processor.

A preferred food processor is shown in FIG. 1 in a top perspective view, including a container 100 and a removably attached lid 200. The container may preferably be essentially a bowl with relatively vertical sidewalls and an open top terminating in a rim. The lid rests on the rim and is removably attachable in the preferred example. A crank handle 300 is removably mounted to the lid to drive the food processor.

Figure 2:
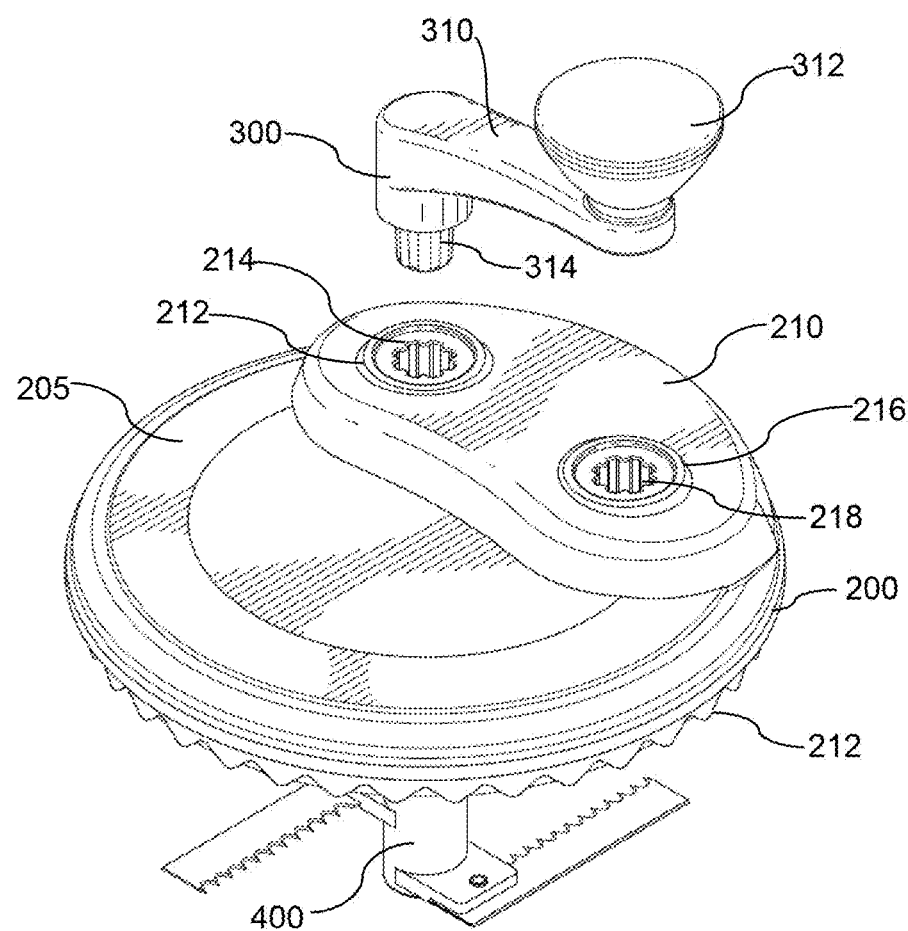
FIG. 2 is an exploded view of a preferred food processor.
Figure 2:
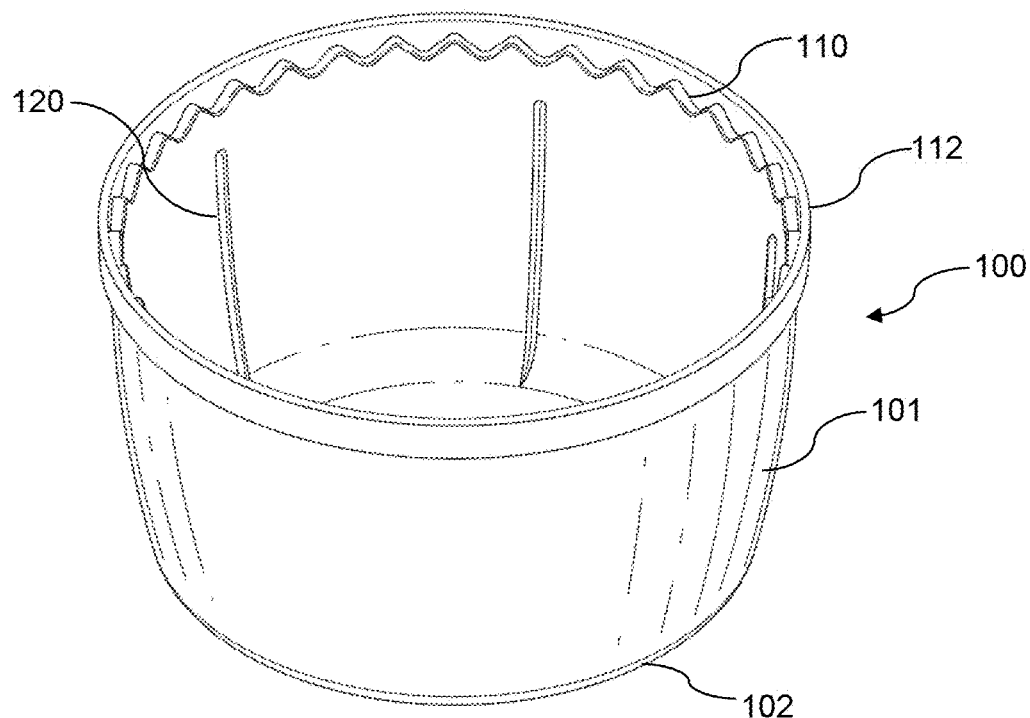

FIG. 2 is an exploded view of the preferred version of a food processor illustrated in FIG. 1. In this preferred example, the container 100 is configured with a lower base 102 and a sidewall 101 extending upwardly from the base to an open rim 112 and includes one or more vertical ribs 120 extending along the interior surface of the sidewall of the container. On an interior surface of the container, just below the rim, an undulating or toothed seat 110 is provided and is configured to interact with a complementary undulating surface 212 at a lower peripheral edge of the lid 200. In the example as illustrated, the undulating seat 110 formed on the container 100 is provided on an upper portion of the container sidewall, encircling the upper interior of the sidewall just below the rim. In one example, the undulations are in the form of alternating concave and convex regions, each being formed essentially as a triangle having rounded apexes. The outer lower perimeter of the lid includes complementary mating teeth, formed in the same shape. The interaction of the undulating or geared surfaces of the lid and container will impede or prevent rotation of the lid with respect to the container while making it easy to remove the lid by simply lifting it from the container (that is, by lifting along the central axis, and without requiring rotation of the lid with respect to the container). In other versions of the invention, different interlocking features may be provided to lock the lid against rotational movement with respect to the container.

The lid is configured to drive a food processing tool such as a bladed processing tool 400 as illustrated. The lid further includes internal gears which are not visible in FIG. 2 for driving the food processing tool. In the illustrated example, the gears are contained within a raised portion 210 of the lid, which forms a gearbox 210 on the upper side 205 of the lid, and which may serve as a convenient grasping location for the hand of a user when in use and rotating the crank handle. In this example, the raised portion of the lid further includes a first crank handle mount 212 with an internally-geared coupler 214 to receive the toothed end 314 of the crank handle. A second crank handle mount 216 and geared coupler 218 is also provided. Both crank handle mounts are sized and configured in the same way, so that the crank 300 with its geared drive end 314 can be attached to either location, as desired. Though two crank handle mounts are provided on the gearbox of the illustrated version, in other versions of the invention the lid may contain three or more crank handle mounts. The crank handle includes a crank arm 310 and a knob or handle 312.

Figure 3:
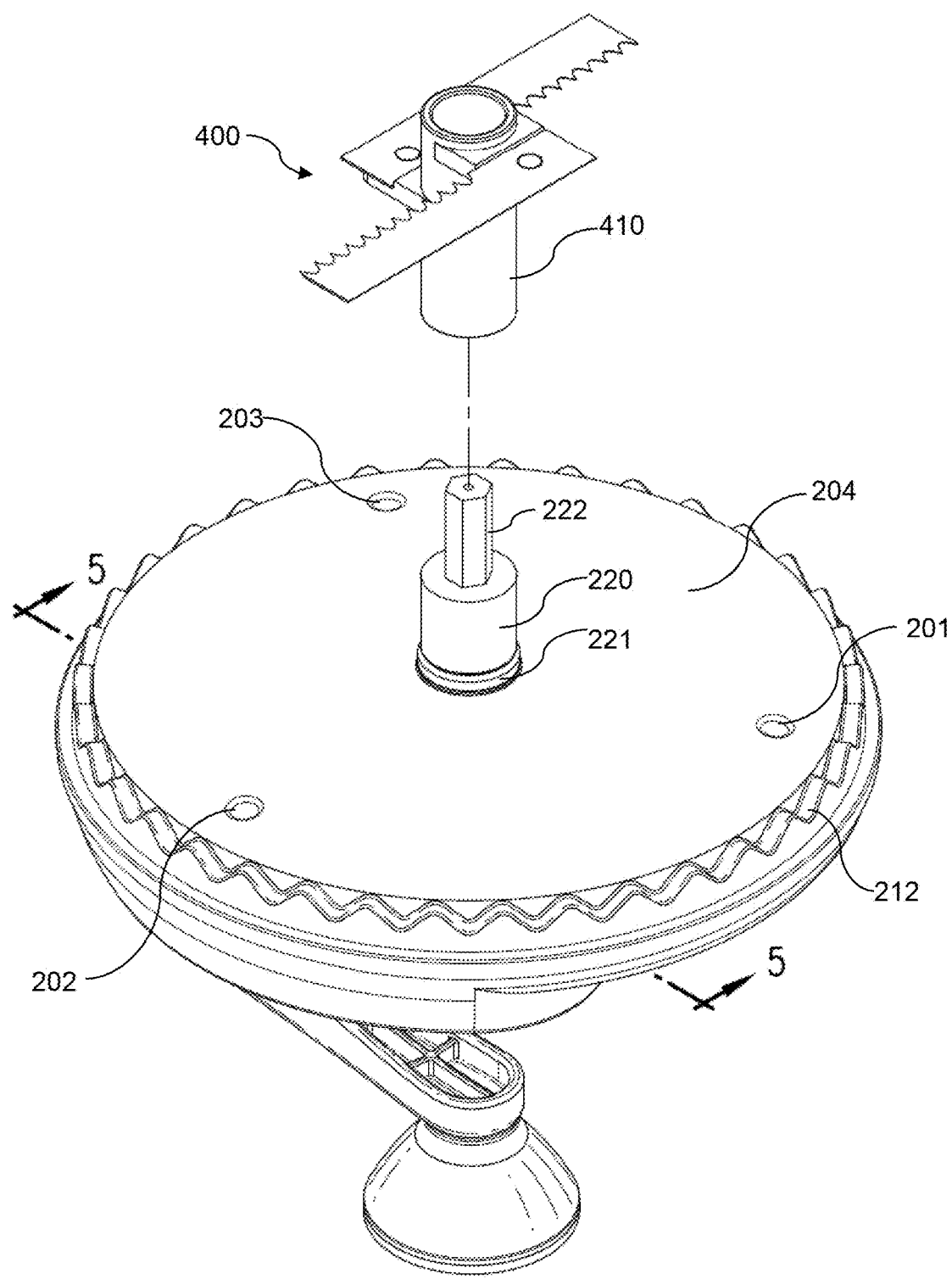
FIG. 3 is an inverted view of a lid for a preferred food processor, shown in partially exploded form with a cutting blade.

FIG. 3 illustrates the lower side 204 of the lid, which was illustrated in a top view in FIG. 2. The lower side includes several locations 201, 202, 203 for fasteners such as screws to join the lower side of the lid 204 to the upper side 205 of the lid. At a central location, a drive post 220 extends from the lid, preferably adjacent an annular seal 221. The drive post terminates in a keyed portion 222, which in the illustrated example is hexagonal in cross section. The keyed portion of the drive post may be received in a mating portion of a drive shaft 410 of a food processing tool 400 in order to rotate the drive shaft and the food processing tool.

Inside the lid, between the lower and upper portions of the lid housing, and preferably within a portion of the lid configured as a gearbox, a plurality of gears are mounted in a fashion to allow rotational force to be conveyed from the crank handle and crank mount and couple to the drive shaft. In addition, the gears are configured so that selection of one of the plurality of crank handle mounts will cause the drive post and drive shaft to rotate at different speeds for a given input rotational speed of the crank.

Figure 4:
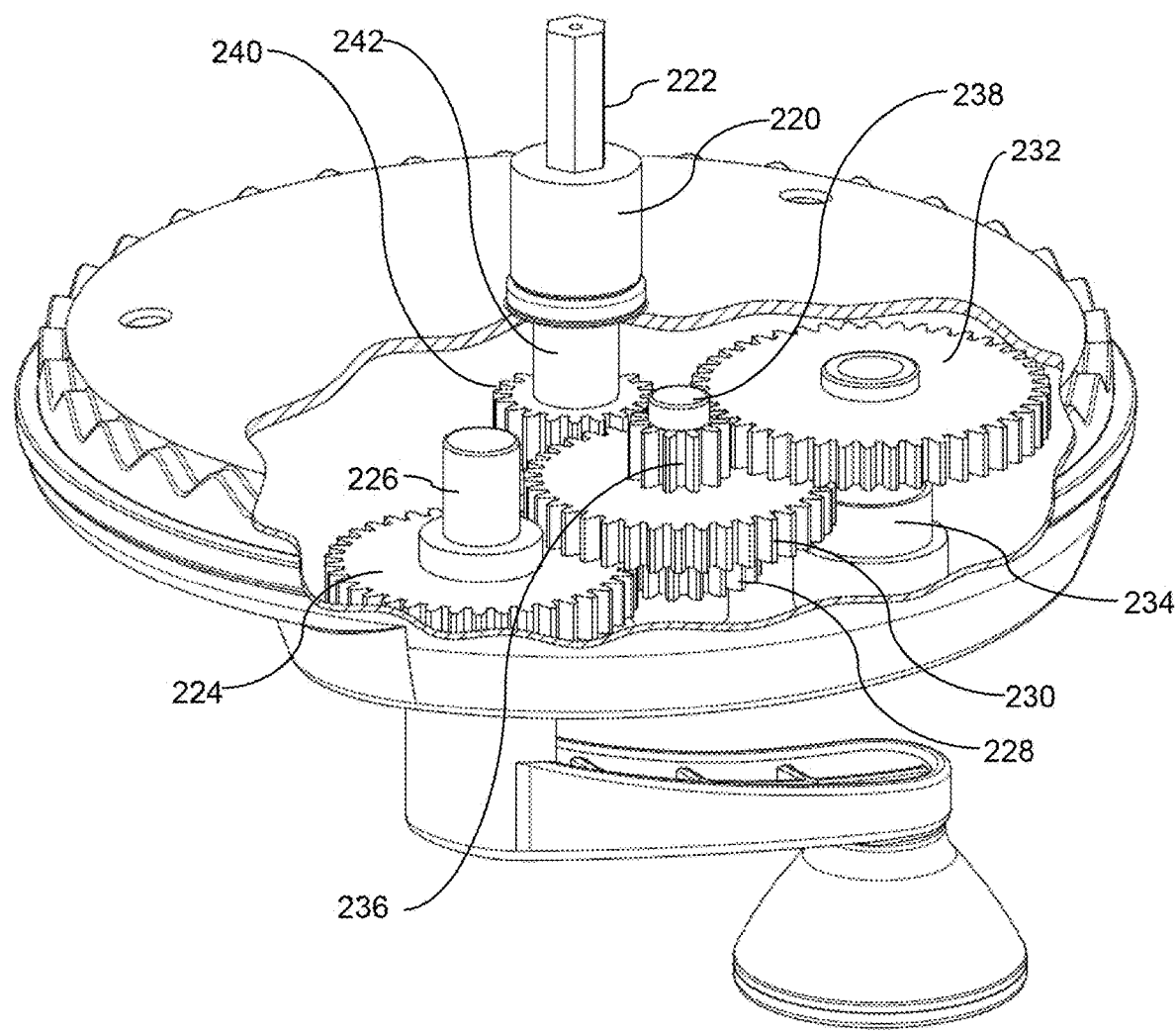
FIG. 4 is a partial cutaway view of the lid of FIG. 3.
Figure 5:
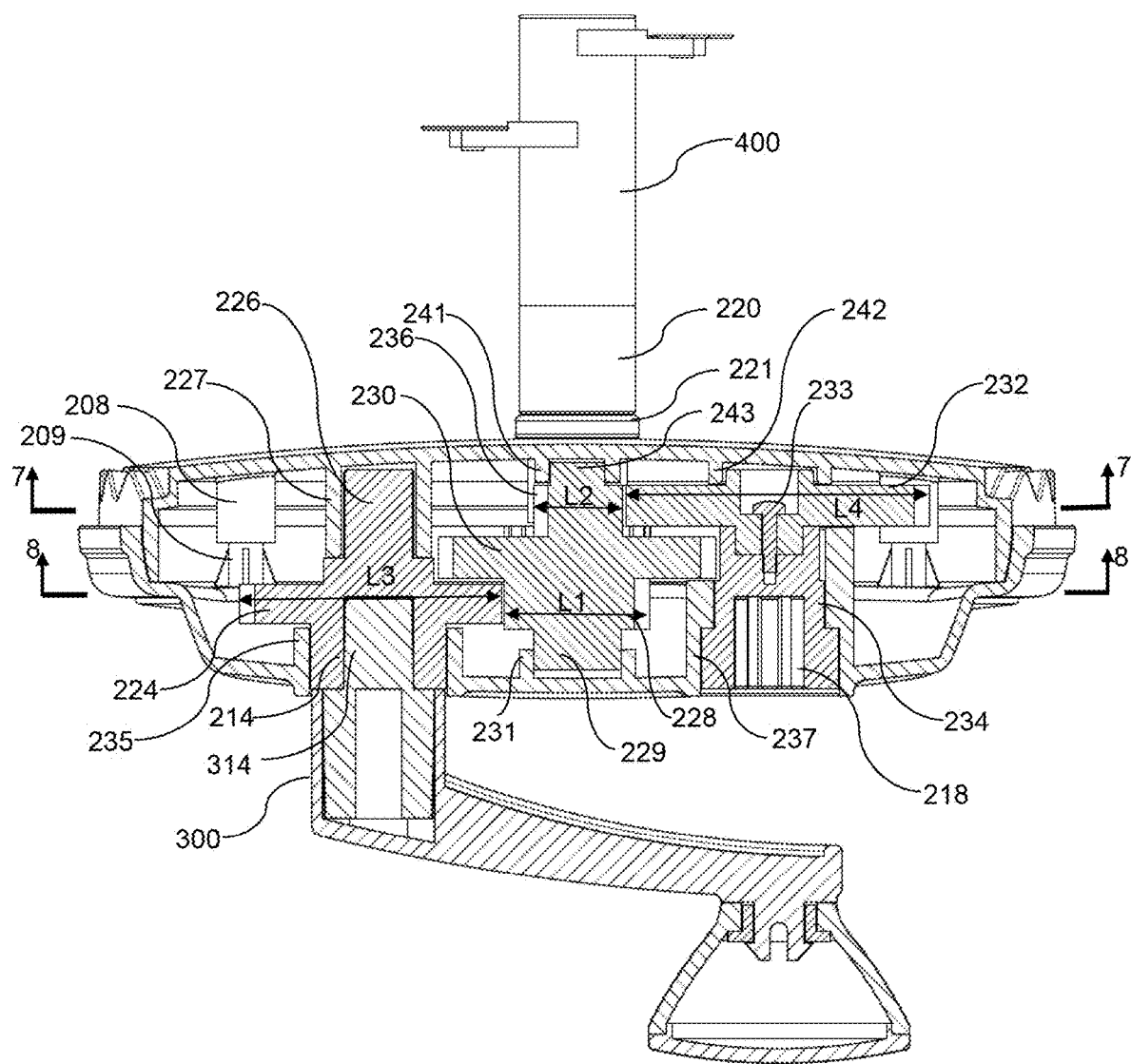
FIG. 5 is a sectional view of a preferred lid, taken along section line 5-5 in FIG. 3.

With reference to the partial cutaway view of the lid in FIG. 4, and the sectional view of FIG. 5 (taken along plane 5-5 in FIG. 3), the nature of the gears within the gearbox is illustrated. As illustrated, the crank handle is shown mounted in the first crank handle mount and the first geared coupler 214. Rotation of the crank handle causes rotation of a first drive gear 224, which is directly connected to the first geared coupler within the first crank handle mount for rotation about a common axis. In one version, the first drive gear 224 is integrally formed to have external gear teeth and an internal splined or geared receiving mount for the crank handle, as described above. The crank handle mount portion is trapped within a cylindrical cavity 235 formed in the upper housing of the lid, while a lower post 226 formed in the component containing the first drive gear is trapped within a cylindrical cavity 227 formed in the lower housing of the lid. When the upper and lower lid housings are attached to one another, such as by screws or other fasteners extending through the lower lid housing via receiving post 208 and internally threaded post 209, the first drive gear is trapped for rotation within the lid about an axis defined by the center of the circular gear.

The first drive gear has peripheral gear teeth which engage a first transmission gear 228. In the illustrated example, the first transmission gear 228 is the lowest (in the orientation of the illustration, with the lid inverted) of three gears on an axially aligned transmission gear stack which further contains a second transmission gear 236 at the top of the stack and a centrally located driving gear 230. In a fashion similar to that described above for the first drive gear, the axially-aligned transmission gear stack with a pair of transmission gears and a driving gear terminates in a lower axial post 239 trapped within a cylindrical cavity 231 formed on the upper lid housing, and a similar cylindrical cavity 241 formed on the lower lid housing. In one version, the gear stack may be integrally formed as a single component; in other versions the three gears forming the stack may be formed separately and joined together using adhesives, fasteners, or other means.

Rotation of the first drive gear 224 causes corresponding rotation of the first transmission gear 228 (and the driving gear 230) by the interaction of the corresponding teeth of the first drive gear and the first transmission gear. Given the joined or unitary nature of the transmission gear stack, rotation of the first transmission gear 228 causes the rotation of the entire transmission gear stack. The rotation of the drive stack which includes the driving gear 230 causes rotation of the driven gear 240, which has teeth that are enmeshed with the driving gear 230. In turn, the driven gear 240 is mounted to a drive post having an internal drive post portion 242, and which extends through the lid to an external drive post portion 220 as described above. Rotation of the crank handle therefore causes rotation of the first drive gear 224, which causes rotation of the first transmission gear 228 and its joined driving gear 230, which causes rotation of the driven gear 240 and the drive post 220 which may have an attached drive shaft and tool 400.

The second crank handle mount also includes a coupler 218 having internal splines or gear teeth, which is mounted within a cavity 237 formed in the upper lid housing. In the illustrated version, the coupler 218 is attached to a second drive gear 232 by a screw 233, such that rotation of the coupler 218 causes rotation of the second drive gear. One end of the second drive gear, closest to the lower lid housing, may also be trapped within a cylindrical cavity 242.

The second drive gear 232 includes peripheral gear teeth which are enmeshed with the second transmission gear 236. As with the other gears, the second transmission gear may terminate in a post 243 which is received within a corresponding cavity formed in the lower surface of the lid.

Rotation of the second coupler and second drive gear causes rotation of the driving gear 230 and then the driven gear and the drive post as with the description above.

Figure 6:
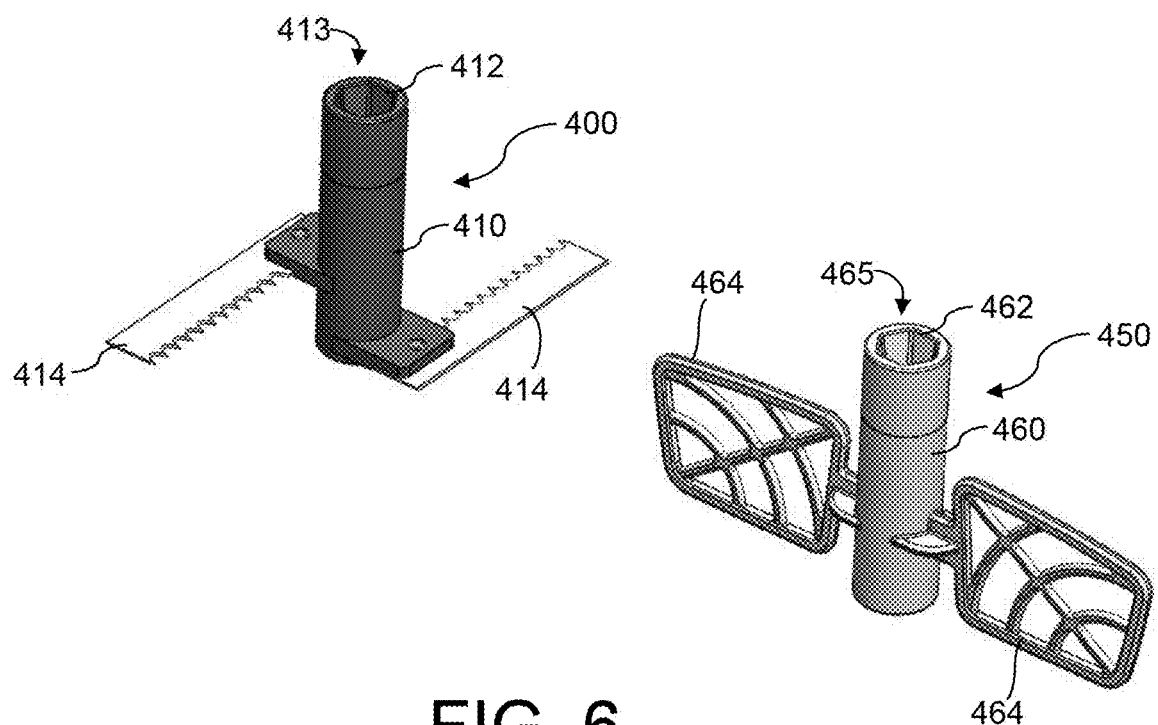
FIG. 6 is a perspective view of two alternate processing tools for use with the preferred food processor.

In each case, the drive post may be connected to a drive shaft which carries a food processing tool. FIG. 6 illustrates a pair of exemplary food processing tools, including a bladed tool 400 and a paddle tool 450. The bladed tool includes a drive shaft 410 having a connection end 412 with a keyed cavity 413 that is configured for attachment to the keyed portion of the drive post. Thus, both the drive post and the drive shaft of the bladed tool are formed with complementary hexagonal shapes. The bladed tool includes one or more blades 414 such that rotation of the drive shaft causes rotation of the blades for food processing.

The food processing tool may also comprise a paddle tool 450, having a drive shaft 460 and keyed cavity 465 at a connection end 462 as with the bladed tool. In this case, rather than blades the paddle tool includes one or more paddles 464 extending radially outward from the drive shaft for food processing.

The relative sizes of the gears within the lid or gear box allow for different rotational speeds of the drive post, and therefore drive shaft, by the selection of a particular one of a plurality of handle mounts and couplers. As best seen in FIG. 5, each of the transmission gears has a different diameter and each of the drive gears has a different diameter. In this case the first transmission gear 228 has a diameter L1 and the second transmission gear has a diameter L2. Likewise, the first drive gear has a diameter L3 and the second drive gear has a diameter L4. By varying one or more of the sizes of the gears, through the diameters above, the rotational speeds of the drive post and drive shaft can be varied. In the preferred example, the driving gear and the driven gear are commonly used by both the first transmission gear and the second transmission gear, such that varying the sizes of these two gears will not change the relative output rotational speeds produced by the first and second handle mounts.

In a preferred version, the arrangement of gear diameter is such that the rotational speed of the drive post 220 produced by the second drive gear is at least twice as fast as that produced by the first drive gear. This is preferably accomplished by varying the number of teeth on the combinations of the first drive gear and first transmission gear, as compared with the number of teeth on the second drive gear and second transmission gear. If the gear teeth are designed in the same interactive fashion for all of the gears, then the gear ratio in each case is a function of the number of teeth of the input gear (in this case the drive gears) divided by the number of teeth of the output gear (in this case, the transmission gears).

In one example, the first and second drive gears are identical to one another, such that L3 is preferably equal to L4 and each has the same number of teeth. By forming the first transmission gear 228 so that it has twice as many teeth as the second transmission gear 236, the second transmission gear will rotate twice as fast as the first transmission gear at the same input from the crank handle at the handle mount. In other versions the gear pitches, diameters, and teeth may be varied differently to achieve the same or different desired results, but in either case the rotational speed produced at the drive post is preferably different based on the input at the first handle mount as compared with that produced at the second handle mount. In a most preferred version, the difference is preferably 2:1, so that one crank handle input produces a drive shaft rotational speed that is twice as great as the rotational speed produced at the other crank handle input. Most preferably, the difference is at least 2:1.

Figure 7:
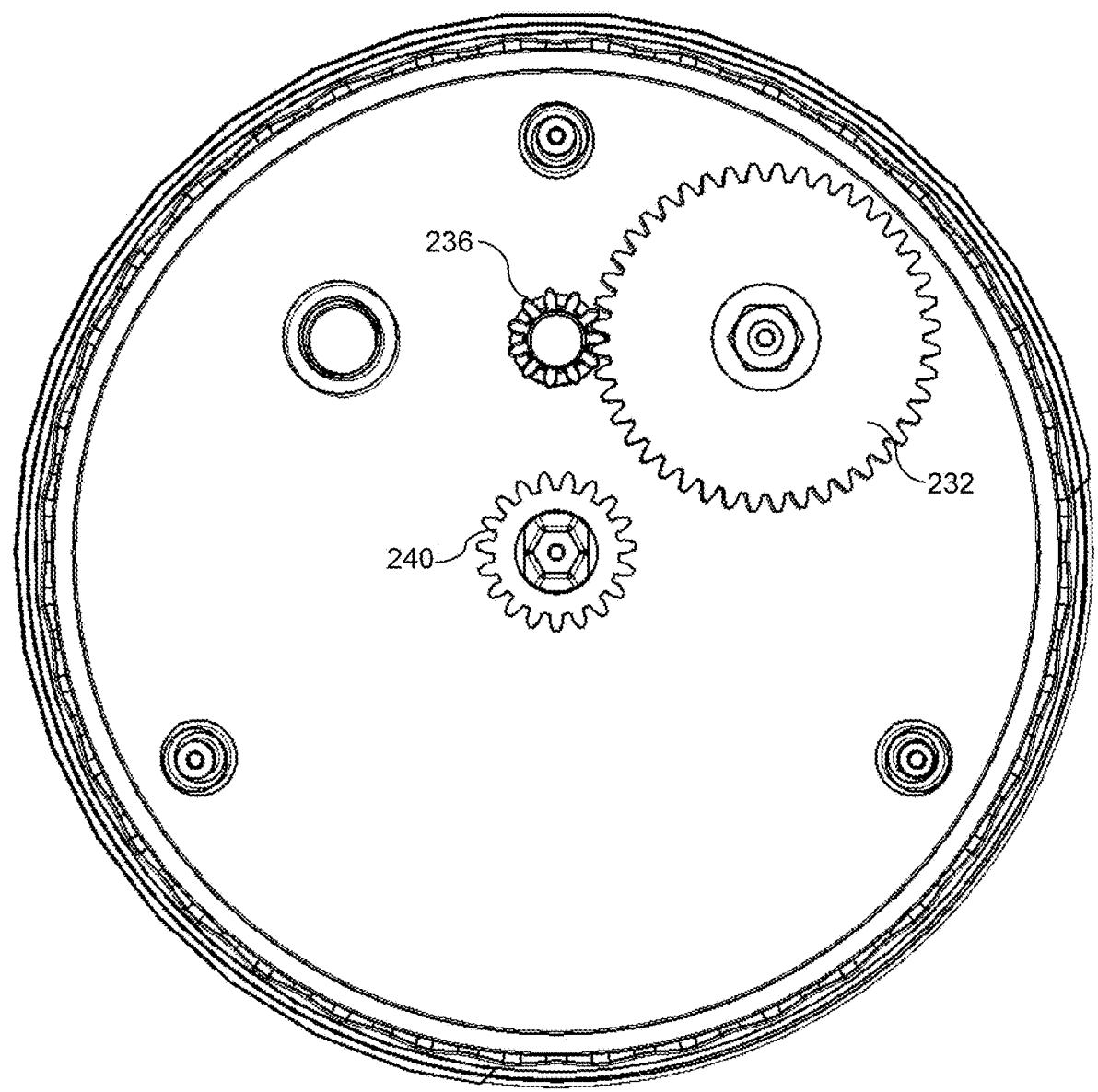
FIG. 7 is a sectional view of the preferred lid, taken along section line 7-7 in FIG. 5.
Figure 8:
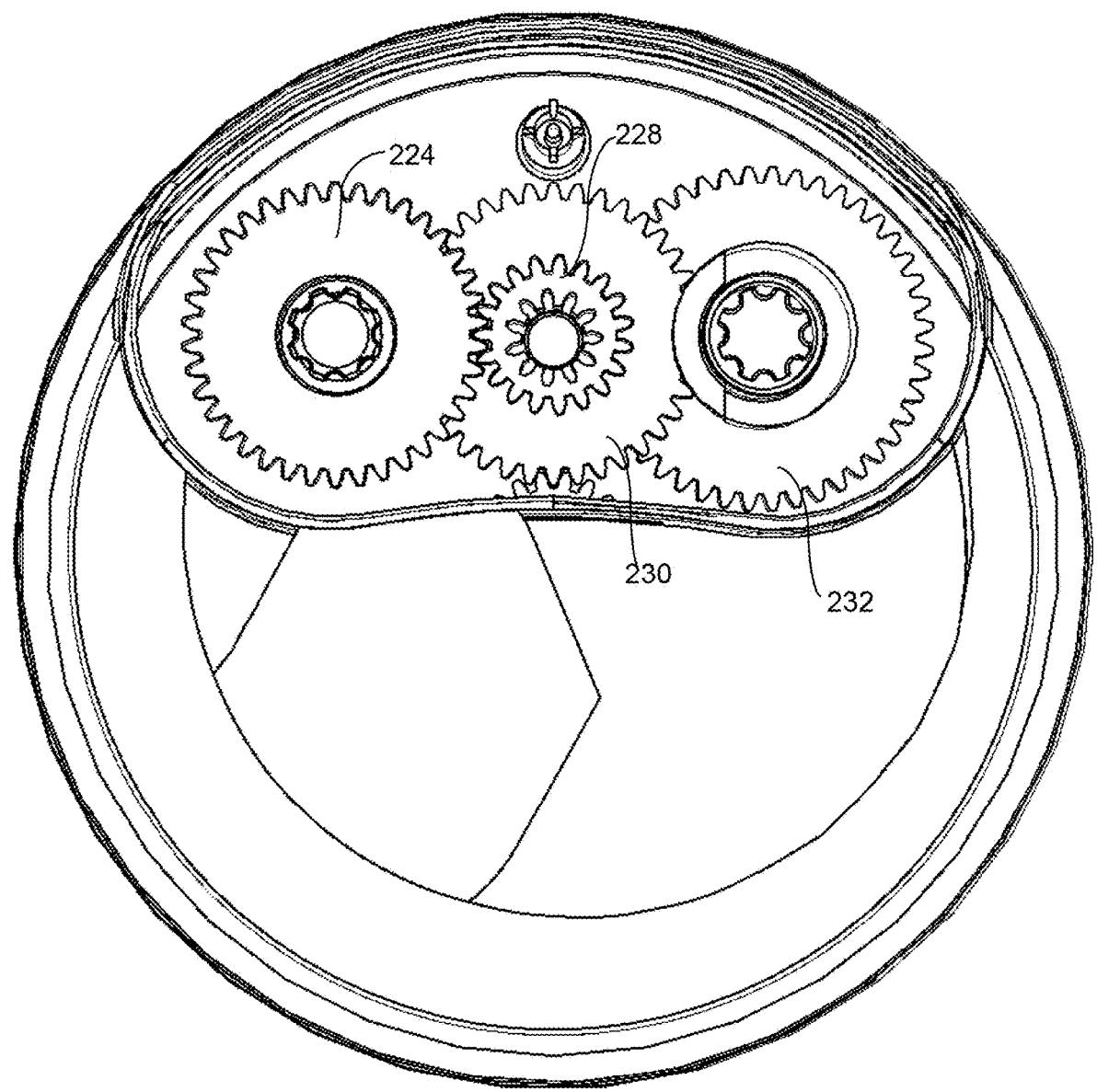
FIG. 8 is a sectional view of the preferred lid, taken along section line 8-8 in FIG. 5.

With reference to FIGS. 7 and 8, which are sectional views taken through planes 7-7 and 8-8, respectively, in FIG. 5, the interaction of the gear teeth in accordance with the preferred version is visible. In the illustrated example, the first drive gear 224 is formed with 38 teeth while the first transmission gear 228 is formed with 19 teeth, as best seen in FIG. 8. This ratio of 38 teeth to 19 teeth provides a gear ratio of 38:19, or 2:1. Further, in the illustrated example, the second drive gear 232 is formed with 44 teeth while the second transmission gear is formed with 11 teeth, as best seen in FIG. 7. This ratio of 44 teeth to 11 teeth provides a gear ratio of 44:11, or 4:1. Thus, the second crank handle mount provides a gear ratio that is twice as great (at 4:1) as that of the first crank handle mount (at 2:1). As described above, the gear ratios may be provided in different ratios by altering the chosen gears, thereby providing still other output speed variations, but most preferably one of the ratios is twice that of the other, or more.

As indicated above, in another version of the invention a third crank handle input and mount may be provided with yet a different gear ratio, to produce a third rotational speed at the drive post. In one such version, the drive stack will further include a third transmission gear for interaction with a third drive gear mounted to the third crank handle input.

In use, a user will connect a desired food processing tool to the drive post, joining the keyed portion of the drive post to the complementary keyed receiving portion of the drive shaft. The bowl can be filled with food items or ingredients as desired, and the lid can then be mounted atop the bowl. The crank handle is inserted (or already has been inserted) into a desired crank handle mount to determine the preferred rotational speed. The user then rotates the crank handle to cause rotation of the gears and food processing tool as described above, thereby causing the blades, paddles, or other tools to impact the food ingredients for processing.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims.

I claim:

1. A food processor, comprising:
   a container having a base and a sidewall extending upwardly from the base to a container rim, the container defining an interior space;
   the container further having a plurality of container undulations spaced along an upper portion of the container;
   a lid removably attachable to the container to enclose the interior space;
   at least one food processing tool carried on a drive shaft, the drive shaft being attachable to the lid and defining a central axis of the container when the lid is attached to the container and the drive shaft is attached to the lid;
   the lid further having a plurality of lid undulations, the plurality of lid undulations being sized and positioned to be complementary to and engageable with the plurality of container undulations when the lid is attached to the container, wherein the lid undulations and the container undulations interact with one another to prevent the lid from rotating with respect to the container, and further wherein the lid undulations and the container undulations are disengageable with one another by movement of the lid along the central axis and without rotation of the lid.

2. The food processor of claim 1, wherein the plurality of container undulations comprise alternating concave and convex regions.

3. The food processor of claim 2, wherein the alternating concave and convex regions extend around the entire rim of the container.

4. The food processor of claim 2, wherein the alternating concave and convex regions each are formed as a triangle having rounded apexes.

5. The food processor of claim 1, wherein the plurality of container undulations are formed on an interior sidewall of the container.

6. The food processor of claim 1, wherein the plurality of lid undulations are formed on a perimeter of the lid.

7. The food processor of claim 1, wherein the plurality of container undulations are positioned below the rim of the container.

8. The food processor of claim 1, wherein the lid comprises a gearbox supported to drivingly engage the drive shaft.

9. A food processor, comprising:
   a container having a base and a sidewall extending upwardly from the base to a container rim, the container defining an interior space;
   the container further having a plurality of container teeth spaced along an upper portion of the container, the container teeth forming a repeating pattern of container teeth having a common size and shape;
   a lid removably attachable to the container to enclose the interior space;
   at least one food processing tool extending from the lid into the container when the lid is attached to the container, the container having a central axis of the container when the lid is attached to the container;
   the lid further having a plurality of lid teeth, the plurality of lid teeth being sized and positioned to be complementary to and engageable with the plurality of container teeth when the lid is attached to the container, wherein the lid teeth and the container teeth interact with one another to prevent the lid from rotating with respect to the container, and further wherein the lid teeth and the container teeth are disengageable with one another by movement of the lid away from the container along the central axis and without rotation of the lid.

10. The food processor of claim 9, wherein the plurality of container teeth form a toothed seat for the lid.

11. The food processor of claim 9, wherein the plurality of container teeth are positioned below the rim.

12. The food processor of claim 9, wherein the plurality of container teeth are positioned on the container sidewall.

13. The food processor of claim 12, wherein the plurality of container teeth are positioned on an interior container sidewall.

14. The food processor of claim 9, wherein the plurality of container teeth encircle the container.

15. A food processor, comprising:
   a container having a base and a sidewall extending upwardly from the base to a container rim, the container defining an interior space;
   a lid removably attachable to the container to enclose the interior space;
   at least one food processing tool extending from the lid into the container when the lid is attached to the container, the container having a central axis of the container when the lid is attached to the container, the lid further having at least one gear drivingly engageable with the at least one food processing tool;
   the container further having an undulating seat positioned on an upper portion of the container sidewall and encircling the container;
   the lid further having a plurality of complementary mating teeth, the complementary mating teeth being sized and positioned to interact with the undulating seat, wherein when the lid is attached to the container the complementary mating teeth engage the undulating seat to prevent the lid from rotating with respect to the container, and further wherein the lid is removable from the container by movement of the lid along the central axis and without rotation of the lid.

16. The food processor of claim 15, wherein the undulating seat is positioned below the rim.

17. The food processor of claim 15, wherein the plurality of complementary mating teeth are positioned at a perimeter of the lid.

18. The food processor of claim 15, wherein the undulating seat is positioned on an interior container sidewall.

19. The food processor of claim 15, wherein the undulating seat comprises alternating concave and convex regions.

20. The food processor of claim 19, wherein the alternating concave and convex regions each are formed as a triangle having rounded apexes.

* * * * *